A. Hermann. Sheet 1, 3 Sheets.
Bilge Water Discharging.
No. 2,713. Reissued Aug. 6, 1867.
A. Fig. 1.
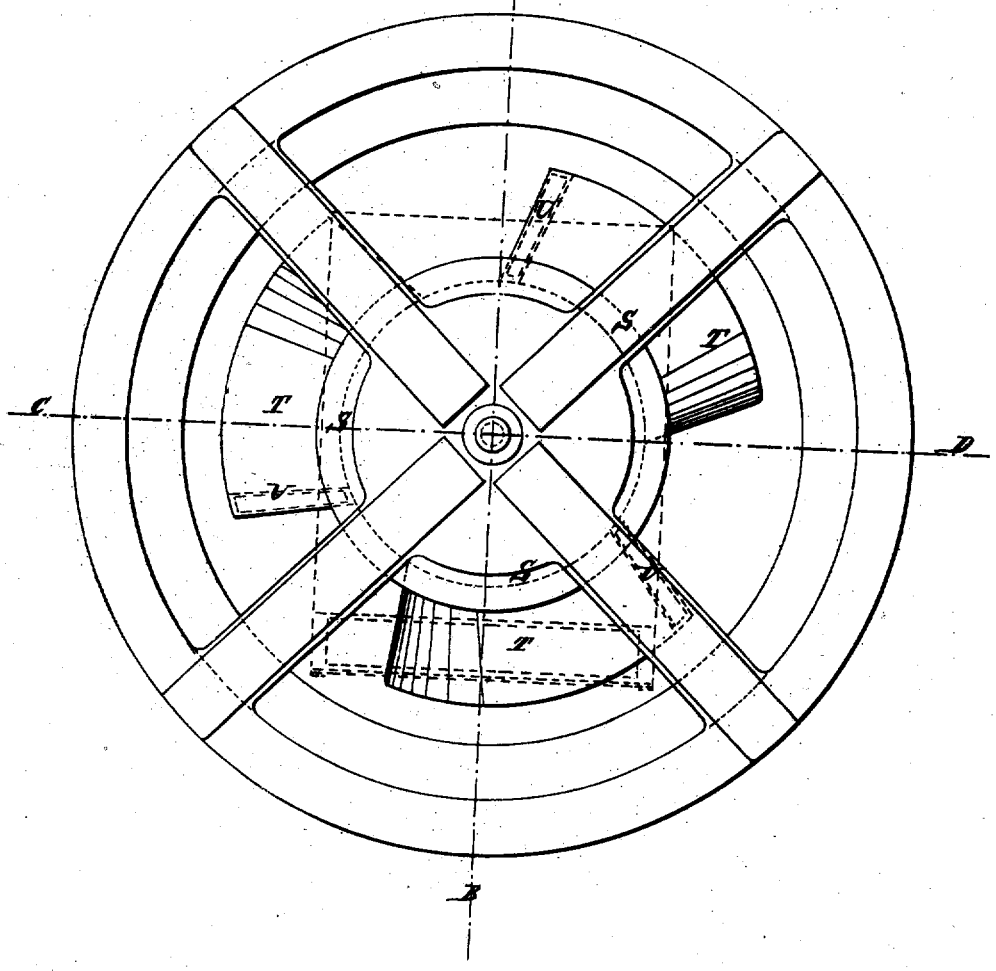
Witnesses.
Chas Mehle
Henry Mehle
Inventor.
August Hermann A. Hermann. Sheet 2, 3 Sheets.
Bilge Water Discharging.
No. 2,713. Reissued Aug. 6, 1867.
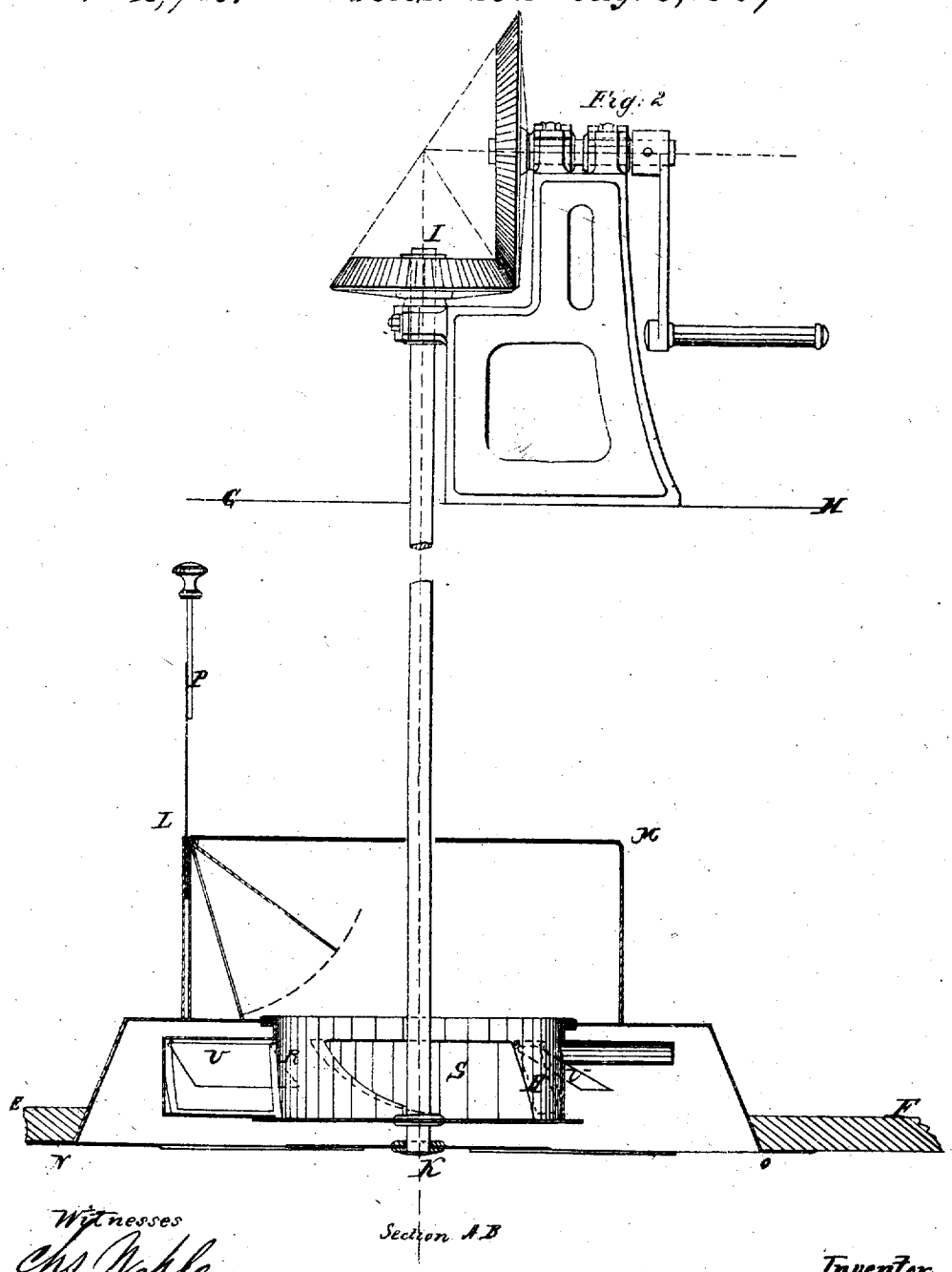
Witnesses
Chs. Wehle
Henry Wehle
Section A B
Inventor
August Hermann A. Hermann. Sheet 3, 3 Sheets.
Bilge Water Discharging.
No. 2,713. Reissued Aug. 6, 1867.
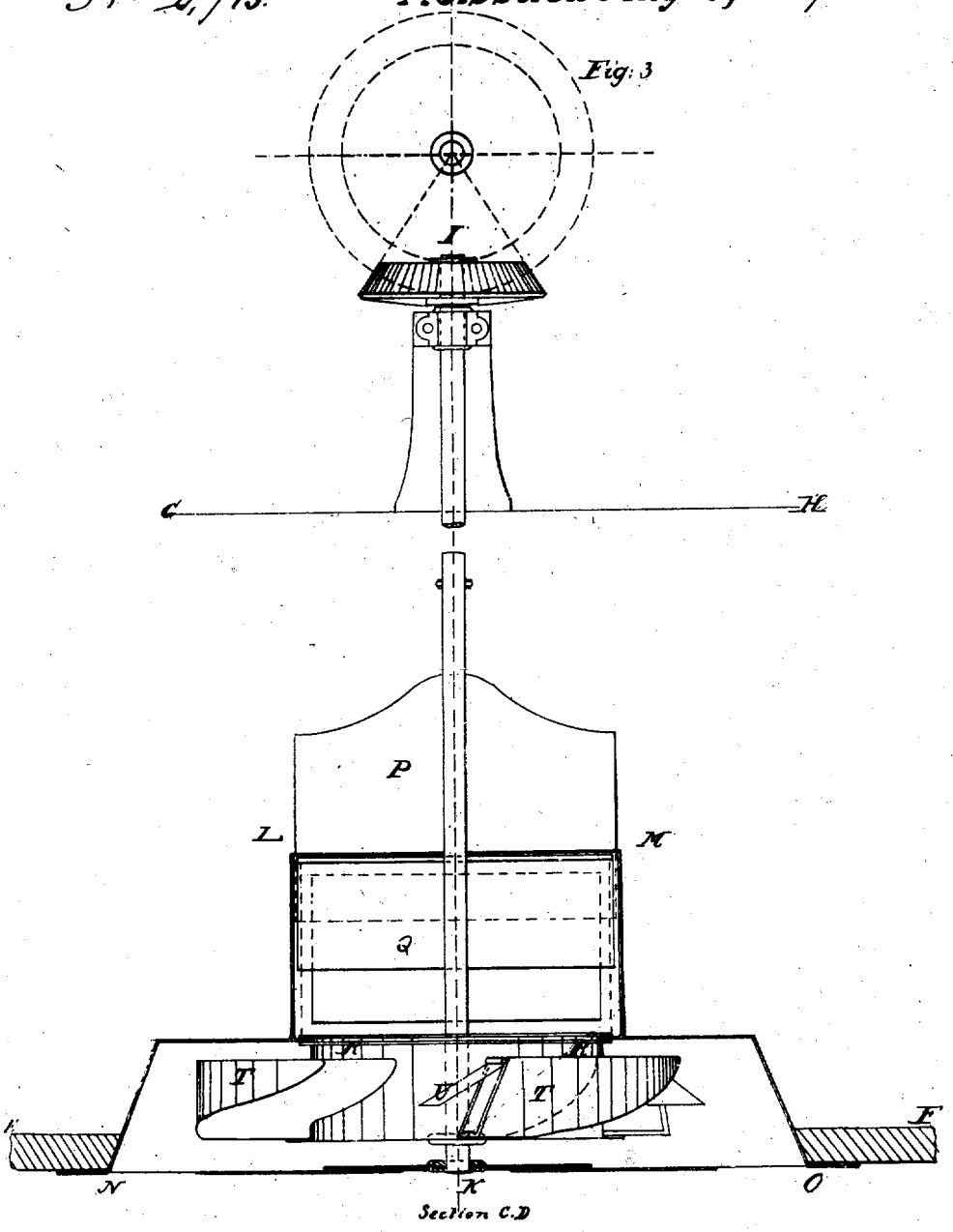
Witnesses.
Chas. Wehle
Henry Wehle
Inventor.
August Hermann

United States Patent Office.

AUGUST HERMANN, OF NEW HAVEN, CONNECTICUT.

*Letters Patent No.* 58,416, *dated October* 2, 1866; *reissue No.* 2,713, *dated August* 6, 1867.

IMPROVED APPARATUS FOR DISCHARGING BILGE-WATER FROM VESSELS' HOLDS.

The Schedule referred to in these Letters Patent and making part of the same.

TO ALL WHOM IT MAY CONCERN:

Be it known that I, AUGUST HERMANN, of New Haven, in the county of New Haven, and State of Connecticut, have invented a new Apparatus for Discharging Water from the Holds of Vessels; and I do hereby declare the following, when taken in connection with the accompanying drawings and the letters of reference marked thereon, to be a full, clear, and exact description of the same, and which said drawings constitute part of this specification, and represent in—

Figure 1, a bottom view of said apparatus.

Figure 2, a cross-section thereof through line A B.

Figure 3, a cross-section thereof through C D.

The nature of my invention consists in constructing, in the bottom or bilge of a ship or vessel, a circular-shaped apparatus, with a vertical axle reaching to the deck of the vessel, by the rotation of which apparatus water accumulated in the vessel will be forced out.

To enable others skilled in the art to make and use my invention, I will proceed to describe the same.

In the annexed drawing, E F represent the bottom of a vessel; G H, the deck thereof; I K represent the vertical axis of my apparatus; L M N O represent the mantle or casing of said apparatus. One part of said mantle consists of a vertical slide, P, moving in grooves. When the said slide is raised, the apparatus is ready for action. Q is the principal valve of the apparatus, hinged on the upper part of the casing. On the axle I K there is permanently fixed a hollow cylinder, R R, which turns with the axle; said hollow cylinder on its circumference has three openings S S S, communicating respectively with three projecting chambers T T T, each of which chambers is provided with a valve, U U U, said valves being so arranged that they will open when the hollow cylinder is turned and remain closed when the said cylinder is at rest. When this apparatus is very large, the rotation of the principal axle and cylinder may require considerable force, and then gearing-wheels, indicated in figs. 2 and 3, may be used to rotate the same.

The operation of this apparatus is as follows: When water has accumulated in a ship provided with this apparatus, which is required to be removed, the slide P is raised, and the axis I K is put in rapid rotation, whereby the hollow cylinder R R will be also rapidly rotated, and will act with its projecting chambers T T T like a centrifugal pump, throwing open the valves U U U, and forcing out the water through the same, by which the main valve Q will be opened and the water there will be forced into the interior of the hollow cylinder, and through it, by means of the valves U U U, to the outside of the vessel. When all the water is thus removed from the vessel, the slide P is lowered, and the rotation is ceased.

It will be observed that the valves U U U operate the same as the principal valve Q. I would here remark that the principal valve Q only need be used, and the valves U dispensed with, inasmuch as the same result may be attained, or the valve Q may be dispensed with and the valves U employed. I would further remark that instead of the projecting chambers T, spiral flanges may extend into the centre, corresponding to the under surface or bottom of the chamber T, so as to work within the cylinder and produce the same result as the arrangement of the chambers T, in which case it is better to dispense with the valve U and depend entirely upon the principal valve Q.

This apparatus may be constructed of any suitable material, and I do not confine myself to the number of chambers or flanges; but having thus fully described my invention, what I claim as new and useful, and desire to secure by Letters Patent, is—

The apparatus, consisting of a vertical shaft or axle I K, provided at its lower end with projecting chambers or flanges T T T, and operating within a cylinder, and provided with valves U, or with valve Q, or both, the whole constructed and arranged so as to operate substantially as and for the purpose described.

AUGUST HERMANN.

Witnesses:

A. J. TIBBITS,

JOHN H. SHUMWAY.